United States Patent [19]

Glew et al.

[11] Patent Number: 5,680,565
[45] Date of Patent: Oct. 21, 1997

[54] METHOD AND APPARATUS FOR PERFORMING PAGE TABLE WALKS IN A MICROPROCESSOR CAPABLE OF PROCESSING SPECULATIVE INSTRUCTIONS

[75] Inventors: Andy Glew, Hillsboro; Glenn Hinton; Haitham Akkary, both of Portland, all of Oreg.

[73] Assignee: Intel Corporation, Santa Clara, Calif.

[21] Appl. No.: 176,363

[22] Filed: Dec. 30, 1993

[51] Int. Cl.$^6$ .................................................. G06F 12/12
[52] U.S. Cl. ........................ 395/415; 395/800; 395/383
[58] Field of Search ................................ 395/400, 375, 395/800, 414, 415, 421.03

[56] References Cited

U.S. PATENT DOCUMENTS

| | | | |
|---|---|---|---|
| 5,136,697 | 8/1992 | Johnson | 395/586 |
| 5,226,126 | 7/1993 | McFarland et al. | 395/394 |
| 5,230,068 | 7/1993 | Van Dyke et al. | 395/464 |
| 5,313,634 | 5/1994 | Eickemeyer | 395/587 |
| 5,327,547 | 7/1994 | Stiles et al. | 395/464 |
| 5,377,336 | 12/1994 | Eickemeyer et al. | 395/383 |
| 5,381,533 | 1/1995 | Peleg et al. | 395/391 |
| 5,394,529 | 2/1995 | Brown, III et al. | 395/587 |
| 5,404,467 | 4/1995 | Saba et al. | 395/383 |
| 5,421,022 | 5/1995 | McKeen et al. | 395/800 |
| 5,442,766 | 8/1995 | Chu et al. | 395/414 |
| 5,553,255 | 9/1996 | Jain et al. | 395/582 |

OTHER PUBLICATIONS

Asprey et al. "Performance Features of the PA7100 Microprocessor" IEEE Micro, Jun. 1993, pp.22–35.
Knebel et al. "HP's PA7100LC: A Low–Cost SuperScalar PA–RISC Processor," COMPCON IEEE Comp. Soc. Int'l Conf., 1993, pp. 441–447.
Moore, "The Power PC 601 Microprocessor," COMPCON IEEE Comp. Soc. Int'l Conf. 1993, pp. 109–116.
Diefendorff, "Organization of the Motorola 88110 Superscalar RISC Microprocessor," IEEE Micro, Apr. 1996, pp. 40–63.
Yeager, Kenneth C. "The MIPS R10000 Superscalar Microprocessor." IEEE Micro, Apr. 1996, pp. 28–40 Apr. 1996.
Smotherman et al. "Instruction Scheduling for the Motorola 88110" Microarchitecture 1993 International Symposium, pp. 257–262.
Circello et al., "The Motorola 68060 Microprocessor," COMPCON IEEE Comp. Soc. Int'l Conf., Spring 1993, pp. 73–78.
"Superscalar Microprocessor Design" by Mike Johnson, Advanced Micro Devices, Prentice Hall, 1991.
Popescu, et al., "The Metaflow Architecture," IEEE Micro, pp. 10–13 and 63–73, Jun. 1991.

Primary Examiner—David K. Moore
Assistant Examiner—Kevin Verbrugge
Attorney, Agent, or Firm—Blakely, Sokoloff, Taylor & Zafman

[57] ABSTRACT

A page table walk is performed in response to a data translation lookaside buffer miss based on a speculative memory instruction. In the event of a data translation lookaside buffer miss, a page miss handler determines whether the memory micro-instruction causing the miss is a speculative or non-speculative micro-instruction. If non-speculative, the page miss handler performs a non-speculative page table walk. If the memory micro-instruction causing the miss is a speculative micro-instruction, the page miss handler initiates a speculative page table walk. While performing the speculative page table walk, the page miss handler determines whether page table memory accessed during the page table walk is speculateable or non-speculateable memory. If non-speculateable, the speculative page table walk is aborted. A micro-instruction assisted page table walk is performed whenever access or dirty bits must be set for the pages accessed in the page table walk.

27 Claims, 9 Drawing Sheets

METHOD AND APPARATUS FOR PERFORMING PAGE TABLE WALKS IN A MICROPROCESSOR CAPABLE OF PROCESSING SPECULATIVE INSTRUCTIONS

BACKGROUND OF THE INVENTION

1. Field of the Invention

The invention generally relates to computer systems and in particular, to the execution of page table walks within a computer system capable of performing speculative memory access operations.

2. Description of Related Art

Current state of the art microprocessors typically include one or more components for facilitating the processing of memory access operations. One such component is a data cache unit ("DCU") which stores a portion of data within a high speed memory. Typically, data from the most recently accessed external memory locations are stored within the DCU such that, if access to the data is required again, the data need not necessarily be retrieved from external memory. Another component commonly employed is a translation lookaside buffer ("TLB") which caches linear addresses and corresponding physical addresses for use in microprocessors wherein data is internally processed using only linear addresses. The TLB is used in connection with a page miss handler ("PMH") which performs a translation of a linear address to a physical address for those addresses not cached within the TLB. In use, the TLB is initially accessed to determine whether the TLB contains the physical address corresponding to a linear address for a desired memory location. If the linear and physical address are not cached within the TLB, then the PMH performs a page table walk to determine the physical address corresponding to the desired linear address. Typically, a page table walk requires a considerable amount of execution time and may require two or more separate accesses to an external memory. It is primarily because the page table walk can be quite time consuming that the TLB is provided to allow for an immediate linear address translation for at least some of the linear addresses processed by the microprocessor.

The DCU, TLB and PMH are conventional components. A wide variety of different implementations for these components have been developed for use in current state-of-the-art microprocessors. As such, the details of the design and operation of the conventional DCU, TLB and PMH will not be described in detail herein.

Problems occur in the implementation of the DCU, TLB and PMH for microprocessors capable of performing operations either out-of-order or speculatively. Out-of-order processing occurs when a microprocessor executes a micro-instruction, herein also referred to as an instruction, in advance of a later-generated instruction. In other words, actual execution of instructions need not be performed in the same order in which the instructions are generated or in which the instructions appear in a software program. Speculative processing occurs in a microprocessor capable of executing instructions which occur subsequent to a branch condition, such as an "If" statement, before the branch condition is actually resolved. In such systems, the microprocessor "guesses" as to which of two or more branches is likely to be taken. Such operations are termed "speculative" since it is not known whether the operations can actually be committed until the branch condition is resolved. If the branch prediction is found to be correct, then the speculatively executed instructions are merely committed to memory, i.e., the speculative instructions are "retired". If the branch prediction is found to be incorrect, then the speculatively executed instructions must be flushed from the system.

As can be appreciated, the capability of performing operations speculatively can result in a great windfall in processing speed. Since the microprocessor need not wait for a branch condition to be resolved prior to executing subsequent instructions. The advantages of performing operations out-of-order or speculatively is ideally exploited in microprocessors which are also capable of pipelined executions wherein two or more operations are performed simultaneously.

Microprocessors capable of out-of-order or speculative execution of instructions are described in "Superscalar Microprocessor Design" by Mike Johnson, Prentice-Hall, Inc. 1991.

Although speculative processing has considerable advantages over non-speculative processing, certain difficulties arise in implementing a page table walk within microprocessors capable of speculative execution. For example, if a TLB miss is detected for a speculative memory instruction, a question arises as to whether a page table walk should be performed speculatively or deferred until all preceding instructions have retired. The present invention is drawn, in part, to solving problems which arise in performing page table walks within microprocessors capable of speculative or out-of-order execution of memory instructions.

BRIEF SUMMARY OF THE INVENTION

The invention generally relates to methods and apparatus for solving problems in the implementation of a page table walk in a microprocessor capable of speculative execution of instructions. In accordance with one aspect of the invention, a PMH is provided within a microprocessor capable at speculative execution of memory instructions, wherein the PMH has means for performing a page table walk speculatively.

The microprocessor preferably includes, in addition to the PMH, an out-of-order engine for generating speculative instructions, a memory ordering buffer ("MOB") for ordering the execution of the memory instructions, a DCU for caching data subject to the memory instructions and a TLB for caching physical address and corresponding linear addresses for selected data locations. The out-of-order engine includes an instruction fetch and issue unit for issuing instructions, a reservation station ("RS") for storing and allocating instructions that have yet to be executed, and a re-ordering buffer for re-ordering and retiring instructions. Retirement involves committing a speculative instruction to a permanent state. The instructions generated by the out-of-order engine each include a value, herein denoted "PDST", which indicates a destination of the result of the instruction within the microprocessor. All instructions handled by the RS and ROB have valid PDST values. Instructions with valid PDST values are processed in an execution pipeline by the microprocessor.

The PMH performs a page table walk, in part, by dispatching page directory entry ("PDE") and page table entry ("PTE") loads which do not have a valid PDST value. Such loads are referred to herein as "stuffed loads". Stuffed loads are not allocated in the RS and ROB, nor dispatched and ordered by the RS and ROB. In this manner, the PMH performs a page table walk without incurring any latency associated with the instruction decoding, allocation, and execution associated with regular loads which are processed by the RS and ROB, and without hindering or delaying the execution pipeline.

In use, the PMH responds to a TLB miss by first determining whether the memory instruction causing the TLB miss, referred herein as the "parent" instruction, is either a speculative instruction or an instruction at retirement. An instruction "at retirement" is an instruction for which all preceding instructions have retired and is itself executing at retirement. If the parent memory instruction is not executing at retirement, then the PMH determines whether the page directory and page table are located in speculateable memory or in non-speculateable memory. Speculateable memory locations are those defined as containing data or other information subject to speculative processing and includes, for example, typical cacheable data. Non-speculateable memory locations are those for which speculative processing is not allowed and includes, for example, memory locations containing uncacheable data such as memory mapped I/O locations. Such memory locations are deemed to be non-speculateable, since a speculative load or store to a memory mapped I/O location may cause an undesirable side-effect. If the memory is non-speculateable, then execution of the page table walk is deferred until the parent instruction is dispatched by the MOB for execution at retirement. The PMH also checks for a variety of page faults or other events which prevent speculative execution and, if found, execution of the page table walk is also deferred until resolution of the fault or other event.

If the parent instruction is not at retirement, the PDE and PTE are stored in speculateable memory, and no page fault or other event has occurred, the PMH proceeds with a speculative page table walk by generating stuffed PDE and PTE loads, appropriately. Unlike the ROB and the RS which are not involved in the execution of stuffed loads, the DCU and MOB respond to the stuffed loads. The DCU, for example, responds to the stuffed loads by fetching data for the stuffed load either from within its internal cache lines or from main memory. The MOB orders the stuffed loads with respect to all stores older than the parent instruction. If the MOB determines that a memory ordering violation may occur as a result of the stuffed loads, the MOB signals the PMH to abort the speculative page table walk. A memory ordering violation is detected by the MOB if, for example, the MOB detects a senior store to the same physical address location as accessed by one of the stuffed loads, wherein a senior store is a store operation that has been retired by the ROB but has not been dispatched to the DCU for subsequent commitment to external memory.

After aborting the speculative page table walk in response to a possible memory ordering violation, the PMH re-dispatches the parent instruction as originally dispatched by the RS, but having a non-speculateable designation. As such, execution of the re-dispatched parent instruction is thereby deferred by the MOB until retirement of the parent instruction.

If the page table walk can be performed speculatively and the aforementioned faults, events or memory ordering violations do not occur, the PMH completes the page table walk by dispatching and responding to the PDE and PTE stuffed loads to ultimately determine the physical address corresponding to the linear address of the parent instruction. Once the physical address is determined, the PMH supplies (or transfers) the physical address to the TLB. Again, the PMH re-dispatches the parent memory instruction and, since the physical address corresponding to the instruction has been loaded in the TLB, the memory instruction can be executed and an appropriate load or store operation performed.

If the parent instruction is already at retirement when a TLB miss is detected, then the PMH performs a non-speculative page table walk by generating stuffed PDE and PTE loads, as appropriate. Since the parent instruction is not speculative, the speculatability of the PDE and PTE memory locations need not be considered. Hence, the PMH need not abort a non-speculative page table walk, even if the PDE and PTE are stored in speculateable memory, as is required if the parent instruction is not at retirement.

In microprocessors capable of speculative execution which also utilizes hardware which sets access and dirty bits in the PTE's to identify pages which are accessed or written by the microprocessor, a further improvement is provided in accordance with the invention. More specifically, if the PMH detects during the page walk that an access or a dirty bit needs to be set, the PMH aborts any speculative page table walk and causes the page table walk to be deferred until the parent instruction has retired, i.e., until the parent instruction is no longer speculative. However, unlike the method and apparatus described above wherein the PMH performs a non-speculative page walk once the parent instruction retires, if an access or a dirty bit needs to be set the page table walk is initiated and controlled by micro-code executed by the out-of-order engine. More specifically, the out-of-order engine generates special micro-instructions which steer the PMH into performing a page table walk for the memory instructions. The micro-instructions also control setting the access and dirty bits.

Thus, the invention provides various methods and apparatus for performing page table walks within a microprocessor capable of generating speculative memory instructions. Other advantages, objects and features of the invention will be apparent to those skilled in the art from the drawings and from the detailed description of the invention which follows.

DETAILED DESCRIPTION OF THE INVENTION

Referring to the figures, preferred embodiments of the invention will now be described.

Figure 1:
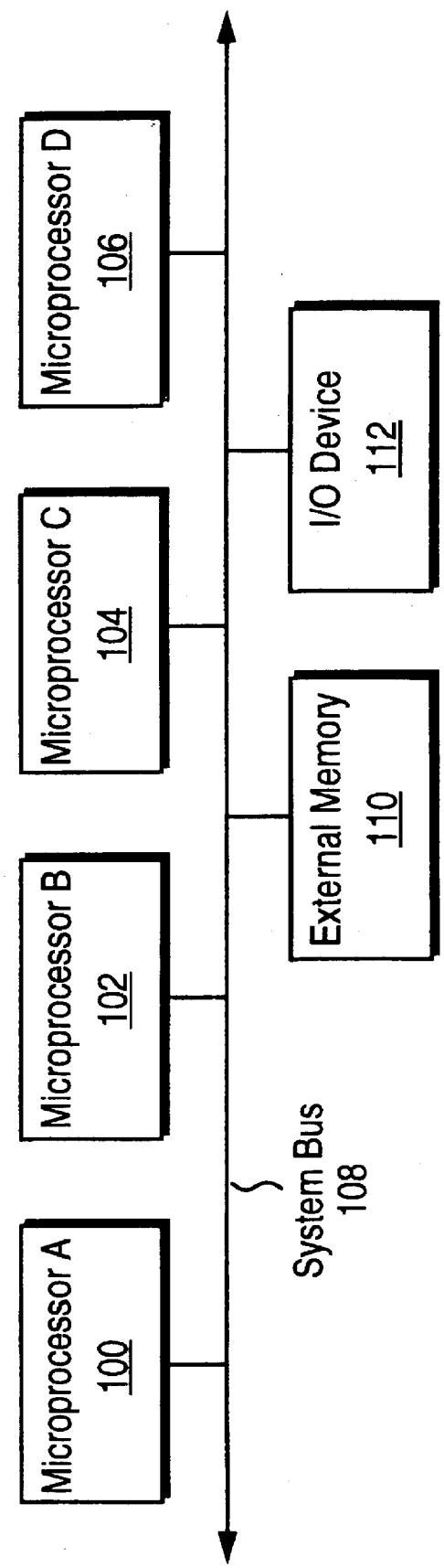
FIG. 1 is a block diagram illustrating a computer system having multiple microprocessors, each configured in accordance with a preferred embodiment of the invention.

FIG. 1 illustrates a multiprocessor computer system having four individual microprocessors 100, 102, 104, and 106 interconnected by a system bus 108. A main memory 110 and an input/output device 112 are also connected to system bus 108. Main memory 110 may include a wide range of memory storage units including ROM's, RAM's and the like. I/O device 112 may include any of a number of input or output devices such as keyboards, CRT displays, and the like. Each of the microprocessors illustrated in FIG. 1 may be identical. As will be described more fully below, each microprocessor is capable of speculative execution of instructions.

Figure 2:
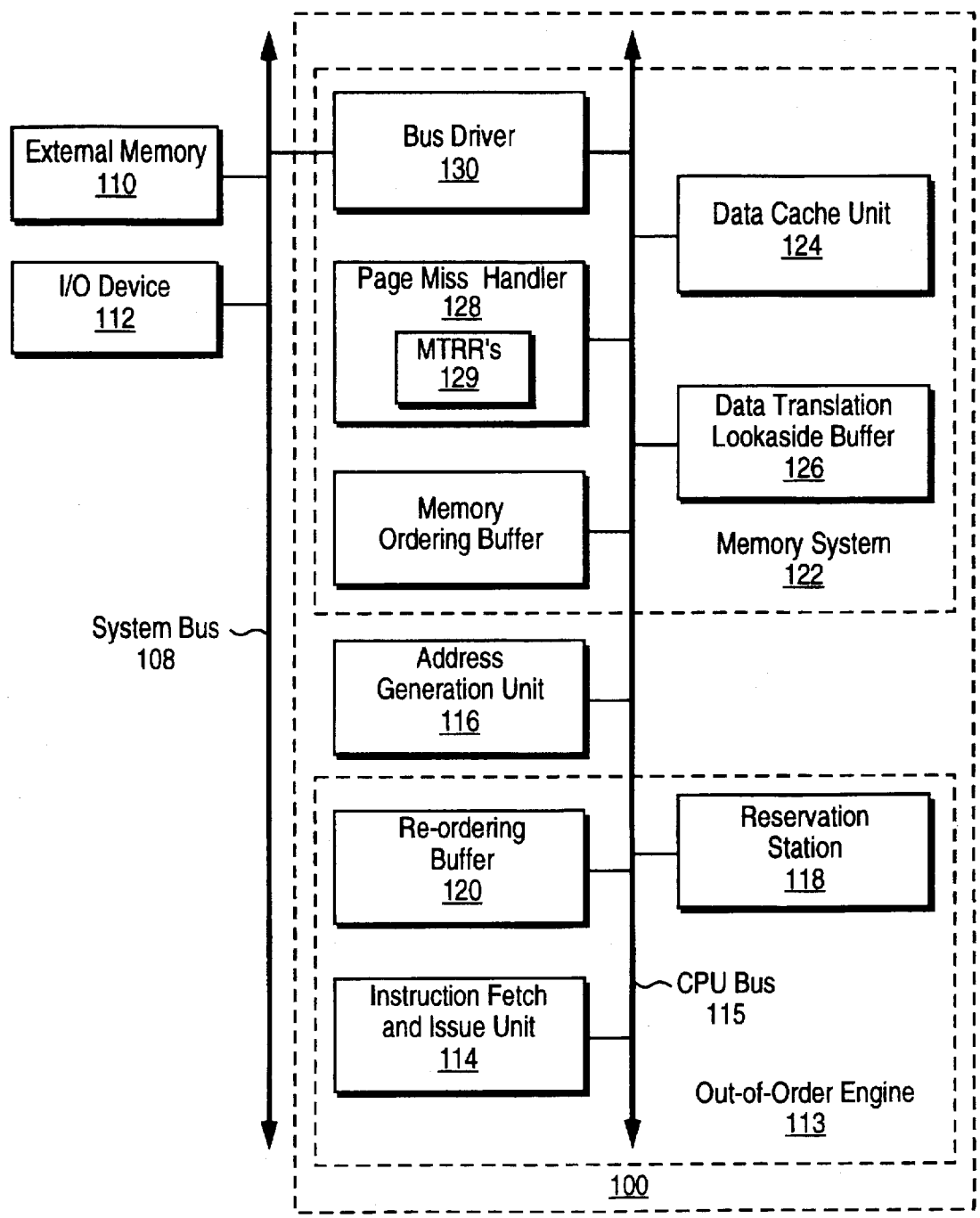
FIG. 2 is a block diagram illustrating selected functional components of one of the microprocessors of FIG. 1, particularly illustrating a page miss handler capable of performing speculative page table walks.

FIG. 2 illustrates selected functional components of microprocessor 100 of FIG. 1. In particular, FIG. 2 illustrates an out-of-order engine 113 which generates computer instructions, referred to herein as micro-operations or "uOP's", such as memory loads and stores. The uOP's are, in general, generated by out-of-order engine 113 in a sequence which may differ from the sequence in which the instructions appear within a user's computer program. Further, out of order engine 113 is capable of making predictions at branch conditions, such as "IF" statements, then speculatively generating instructions subsequent to the branch condition. The instructions are generated out-of-order or speculatively, in part, to allow microprocessor 100 to exploit any parallelism within the computer code to be executed and to exploit pipelining capability of the microprocessor.

Out-of-order engine 113 includes an instruction fetch and issue unit 114 for issuing uOP's and an RS 118 for allocating uOP's that have not yet been executed, then dispatching the uOP's to other functional units according to speculative data dependencies and according to the availability of the other functional units. A general description of a reservation station may be found in the above-cited "Superscalar Microprocessor Design" reference.

Out-of-order engine 113 also includes a ROB 120 which stores speculative results from instructions dispatched by RS 118 and executed by one of the functional units. ROB 120 collects the results from speculative uOP's, reorders the uOP's, then retires the uOP's. In other words, whereas the uOP's may be dispatched from out-of-order execution engine 113 in an order other than that which appears in a computer program, ROB 120 reorders the uOP's to yield the sequence of events specified by the computer program. As with the above-described reservation station, a general description of a re-order buffer may be found in the "Superscalar Microprocessor Design" reference.

The linear addresses for instructions dispatched by RS 118 are calculated by address unit 116. The uOP's are dispatched from out-of-order engine 113 in either a protected mode or in a real mode. In protected mode, the linear address for the uOP is calculated by AGU 116. In real mode, AGU 116 calculates a physical address for the uOP. The uOP, containing the linear address or physical address, is output from AGU 116 onto CPU bus 115 for routing to a functional unit of the microprocessor for execution of the uOP.

uOP's which involve memory accesses such as memory loads and memory stores are executed by a memory system 122. Memory system 122 includes a DCU 124, a DTLB 126, a PMH 128, a memory system bus driver 130, and a MOB 132. DTLB 126 maintains a cache of address translations between linear addresses and corresponding physical addresses. In use, a uOP dispatched by RS 118 is intercepted from CPU bus 115 by DTLB 126 which performs a look-up to determine whether its internal cache lines contain the physical address corresponding to the linear address of the uOP. If the address translation is found therein, DTLB 126 re-dispatches the uOP, updated to include the physical address, onto CPU bus 115. In the following, protected mode operation will be assumed. In a preferred embodiment, DTLB 126 also stores a memory-type value which indicates whether the physical address of the memory access specified by the uOP contains speculateable information or non-speculateable information.

DCU 124 includes internal cache lines maintaining data for many of the most recently accessed memory locations. DCU 124 intercepts the uOP containing the physical address and accesses internal cache lines to determine if the data for the memory access of the uOP is already contained therein. If the data is contained within DCU 124, the data is retrieved from the internal cache lines and dispatched onto CPU bus 115 for further processing by other functional units of microprocessor 100, such as ROB 120. If the data is not found within DCU 124, system bus driver 130 is accessed to transmit memory requests to external memory 110 to access the data specified by the uOP. Preferably, DCU 124 is capable of processing data using any one of several cache protocols such as write-back and write-through cache protocols. The memory-type value cached within DTLB 126 is preferably used in determining which cache protocol is appropriate for a particular uOP.

In the event that the translation between the linear address and a physical address is not cached within DTLB 126, then PMH 128 performs a page table walk to determine the corresponding physical addresses. If the uOP causing the DTLB miss is a non-speculative uOP, PMH 128 merely performs a non-speculative page table walk by issuing stuffed PDE and PTE load operations. If, however, the uOP causing the DTLB miss is a speculative uOP, then PMH 128 performs a page table walk speculatively, also by issuing stuffed PDE and PTE loads. The details of stuffed loads and of the speculative page table walk will be described below, primarily with reference to FIGS. 4 and 5. PMH 128 also includes a set of memory-type range registers (MTRR's) 129 which relate physical addresses to memory types.

MOB 132 orders memory accesses. More specifically, the MOB maintains lists (not shown) of memory loads and stores and checks the loads and stores for possible adverse memory effects. MOB 132 reorders the memory access operations accordingly and may postpone execution of particular memory access operations until ordering problems are resolved. In particular, the MOB blocks execution of any memory uOP's that are not at retirement and are known to be non-speculateable. As with some of the above-described functional components of microprocessor 100, a general description of a MOB is provided within the "Superscalar Microprocessor Design" reference cited above.

Figure 3:
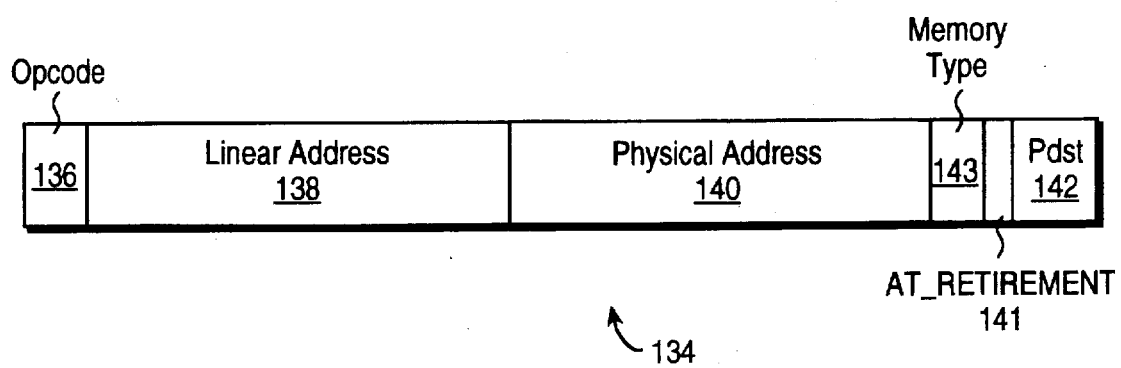
FIG. 3 is a block diagram illustrating an operational code executed by the microprocessor of FIG. 2.

An exemplary uOP 134 is illustrated in FIG. 3. uOP 134 includes an operational code (OPCODE) 136, space for a linear address 138, space for a physical address 140 and space for a physical destination address (PDST) 142. OPCODE 136 is a code indicating the type of operation to be performed and may, for example, identify a memory store or memory load operation. PDST stores a code which identifies the destination within microprocessor 100 of the results of the uOP. Linear and physical address sections 138 and 140 store the linear and physical addresses, respectively, if known. uOP 134 also stores an at-retirement bit 141 and a memory-type value 143. At-retirement bit 141 identifies whether the uOP is executing at retirement. As noted above, if a uOP is at retirement, it is no longer speculative. A uOP which is not yet at retirement, may be speculative. Memory-type value 143 is a value indicating, for example, the speculatability of the memory location to be accessed by the uOP. Unless the memory type value is found within DTLB 126 as a result of a DTLB hit, the memory-type may not be known. As will be described below, the memory type is determined during a page table walk performed in response to the DTLB miss by accessing MTRR's 129.

Now considering the PDST value in greater detail. The PDST value identifies an entry allocated for the uOP in the ROB. Execution units, such as the DCU, which return results from a completed uOP, assert a PDST value and an associated valid bit onto the CPU bus to indicate to the RS and the ROB that data for the uOP is being written back. Since uOP's are completed out-of-order, the ROB and RS need to know which results received, during a given write-back cycle, are associated with which instructions.

uOP 134 may additionally include a wide range of other information for facilitating the processing and execution of the uOP. For brevity and clarity, such additional information is not described herein, but further information regarding the uOP's structure may be found in the above-identified co-pendings patent applications.

As noted, PDST 134 stores a PDST value identifying the destination of results of the uOP. All uOP's processed by ROB 120 and RS 118 (FIG. 2) have a valid PDST value. In other words, ROB 120 and RS 118 ignore uOP's which do not contain a PDST value or which contain a PDST value which is not valid.

As will be described more fully below, while performing a page table walk, PMH 128 dispatches stuffed PDE and PTE load operations which do not have valid PDST values. Accordingly, the stuffed PDE and PTE load operations are not processed by ROB 120 or RS 118. By dispatching stuffed PDE and PTE loads during a page table walk, any latency which may occur as a result of the operation of RS 118 and ROB 120 is avoided. Additionally, in a preferred embodiment, all uOP's having a valid PDST value are processed in a pipelined manner. Since the stuffed loads generated by the PMH do not include a valid PDST value, the stuffed loads do not interfere with the execution pipeline. In this manner, a page table walk is performed for a uOP which misses DTLB 126 without adversely affecting the overall ordering and pipelined execution of other uOP's. MOB 132, unlike ROB 120 and RS 118, responds to uOP's which lack a valid PDST value. Hence, MOB 132 responds to the stuffed PDE and PTE loads.

If PMH 128 determines that the uOP causing a DTLB miss is "at retirement", then PMH 128 performs a non-speculative page walk by dispatching stuffed PDE and PTE loads. If, however, the uOP is not at retirement, then the PMH attempts a speculative page table walk, also by dispatching stuffed PDE and PTE loads. More specifically, the PMH determines whether the PDE and PTE loads, generated to perform the page table walk, access speculateable or non-speculateable memory. If the PDE and PTE loads access non-speculateable memory locations, then the PMH aborts the page table walk pending retirement of the parent uOP. If the memory locations accessed by the PDE and PTE stuffed loads are speculateable memory locations, then the PMH does not abort the speculative page table walk but attempts to complete the speculative page table walk. Other events, however, may require the PMH to abort the speculative page table walk, including the detection of a need to set an access or dirty bit.

As noted, the RS and the ROB do not respond to uOP's lacking a valid PDST value. The PMH, however, does latch the stuffed load uOP's, even though the uOP's lack a valid PDST value. This may be achieved by having the DCU assert a special interface signal to the PMH indicating that results from a stuffed load are being written back to the PMH. This allows the DCU to return the results from stuffed loads to the PMH, rather than to the normal destination for uOP results, i.e., the RS and the ROB. It should be noted that multiple PMH units, concurrently handling more than one page miss, can be implemented as an alternative to the single PMH embodiment, described herein.

Also, the PMH aborts a speculative page table walk if the page table memory is non-speculateable. One reason for aborting the speculative page table walk under such circumstances is the following. If the current uOP is speculative, the uOP may have been the result of a mis-predicted branch such that the linear address computed for the parent uOP by the AGU may be incorrect. The incorrect linear address may be mapped by the paging algorithm to non-speculateable memory, such as memory mapped I/O, rather than to the correct PDE/PTE table. To avoid any side affects by loading data from non-speculateable memory such as memory mapped I/O, the PMH aborts the page table walk and defers the page table walk until the parent uOP is at retirement at which time the PMH is certain that the parent uOP was not the result of a mis-predicted branch and that the linear address received from the AGU for the parent uOP is a correct linear address.

The foregoing provides a brief overview of the operation of microprocessor 100, particularly the manner by which the microprocessor handles DTLB misses for speculative uOP's.

FIGS. 1–3 illustrate only relevant functional components of the microprocessor system. For clarity, numerous implementation details are not explicitly shown. For example, the single CPU bus illustrated in the figures may actually include several separate bus lines including separate busses for linear addresses, physical addresses, write-back results from the DCU, and OPCODE'. Also, the separate physical address of the bus may be interconnected only to the PMH, DTLB and DCU. In other words, not all units need access to physical addresses. The out-of-order engine may include separate internal components such as a sequential instruction fetch, a micro-code unit, an instruction decoder and an allocater unit. Also, integer and floating point units may be included within the microprocessor which are not expressly illustrated. A separate instruction TLB may also be provided.

With reference to the remaining figures, the method and apparatus by which the speculative page table walks are performed will be described in greater detail.

Figure 4:
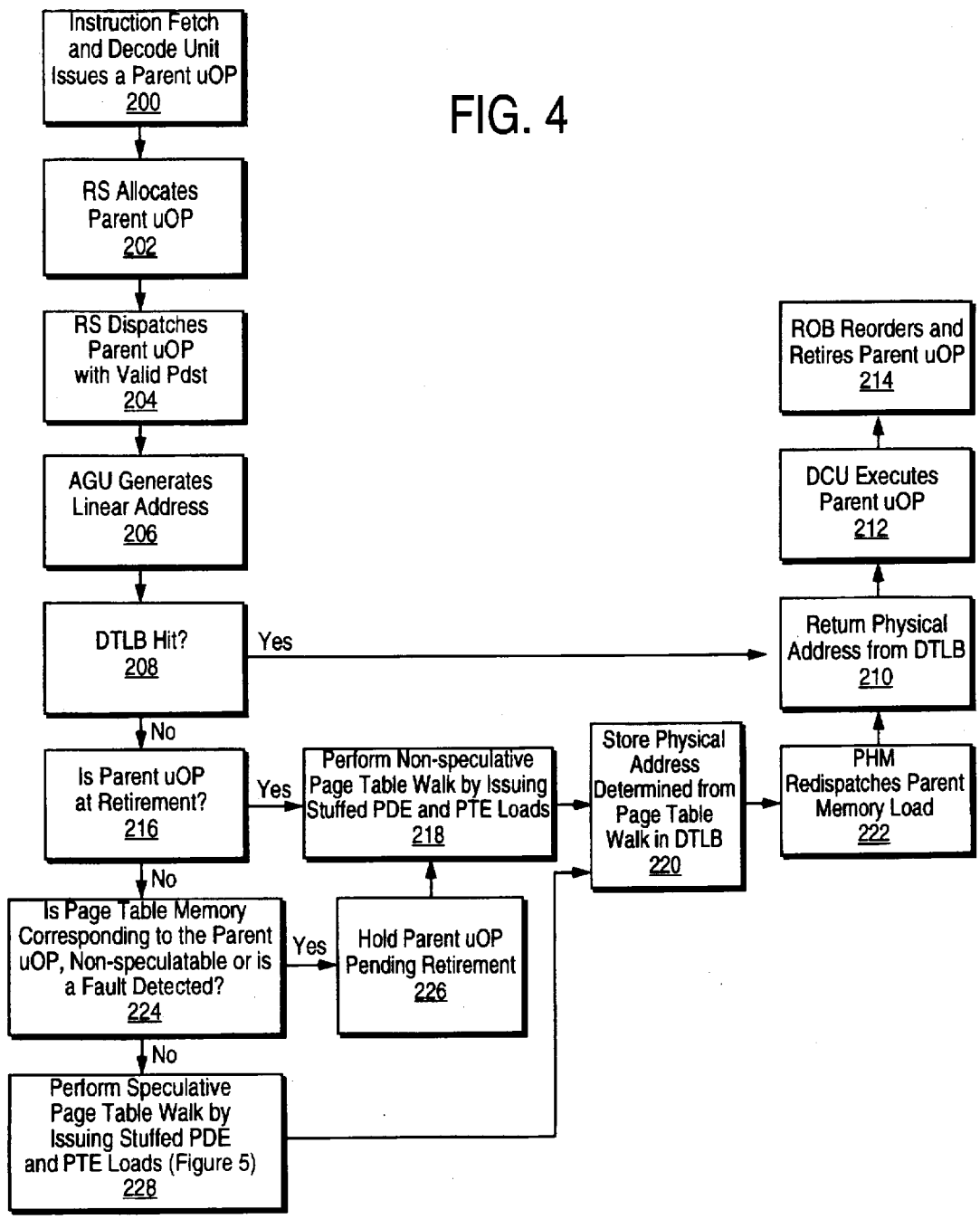
FIG. 4 is a block diagram illustrating a method and apparatus for performing a speculative page table walk within the microprocessor of FIG. 2.
Figure 5:
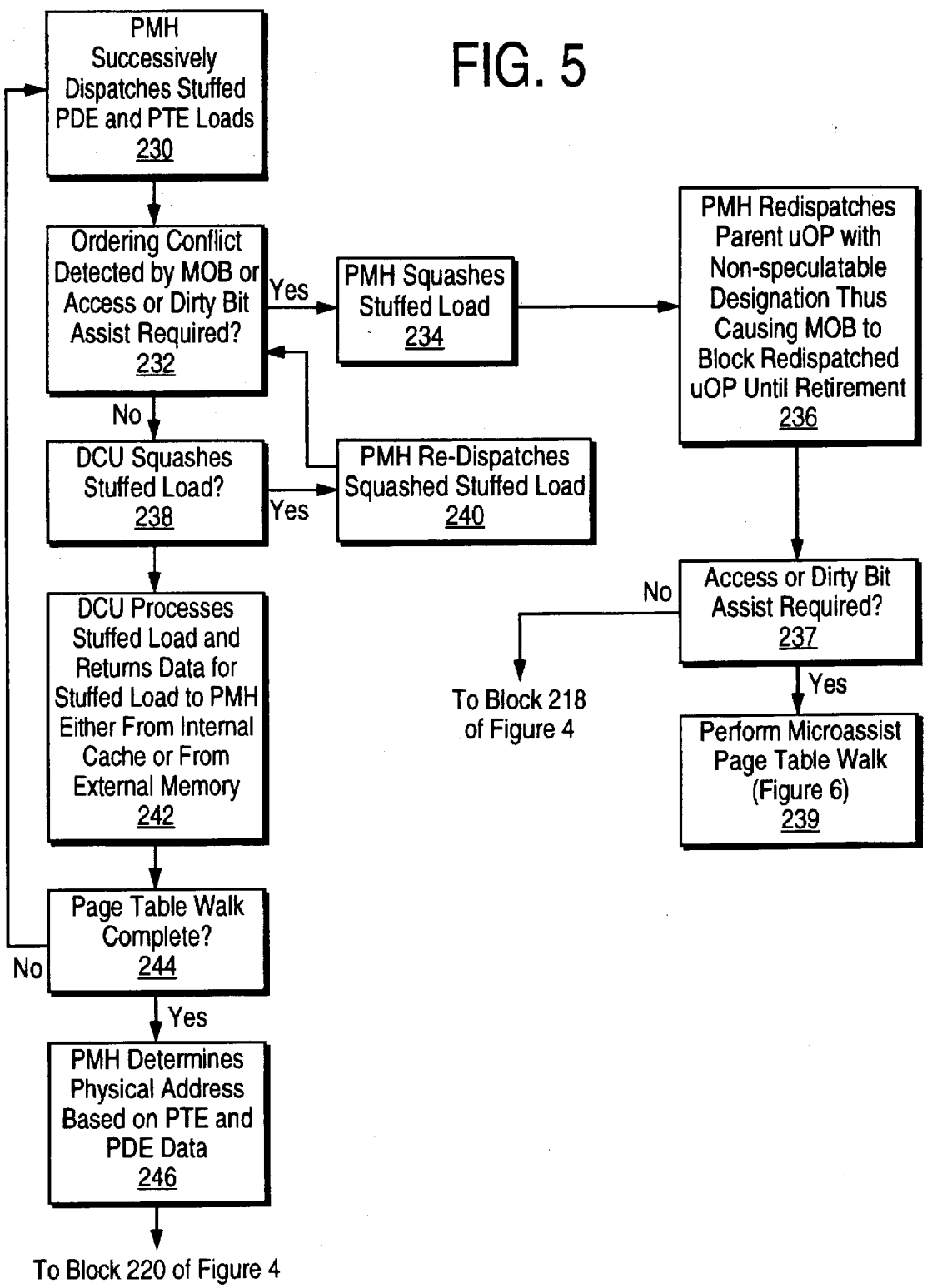
FIG. 5 is a block diagram further illustrating the method and apparatus for performing a speculative page table walk within the microprocessor of FIG. 2.
Figure 6:
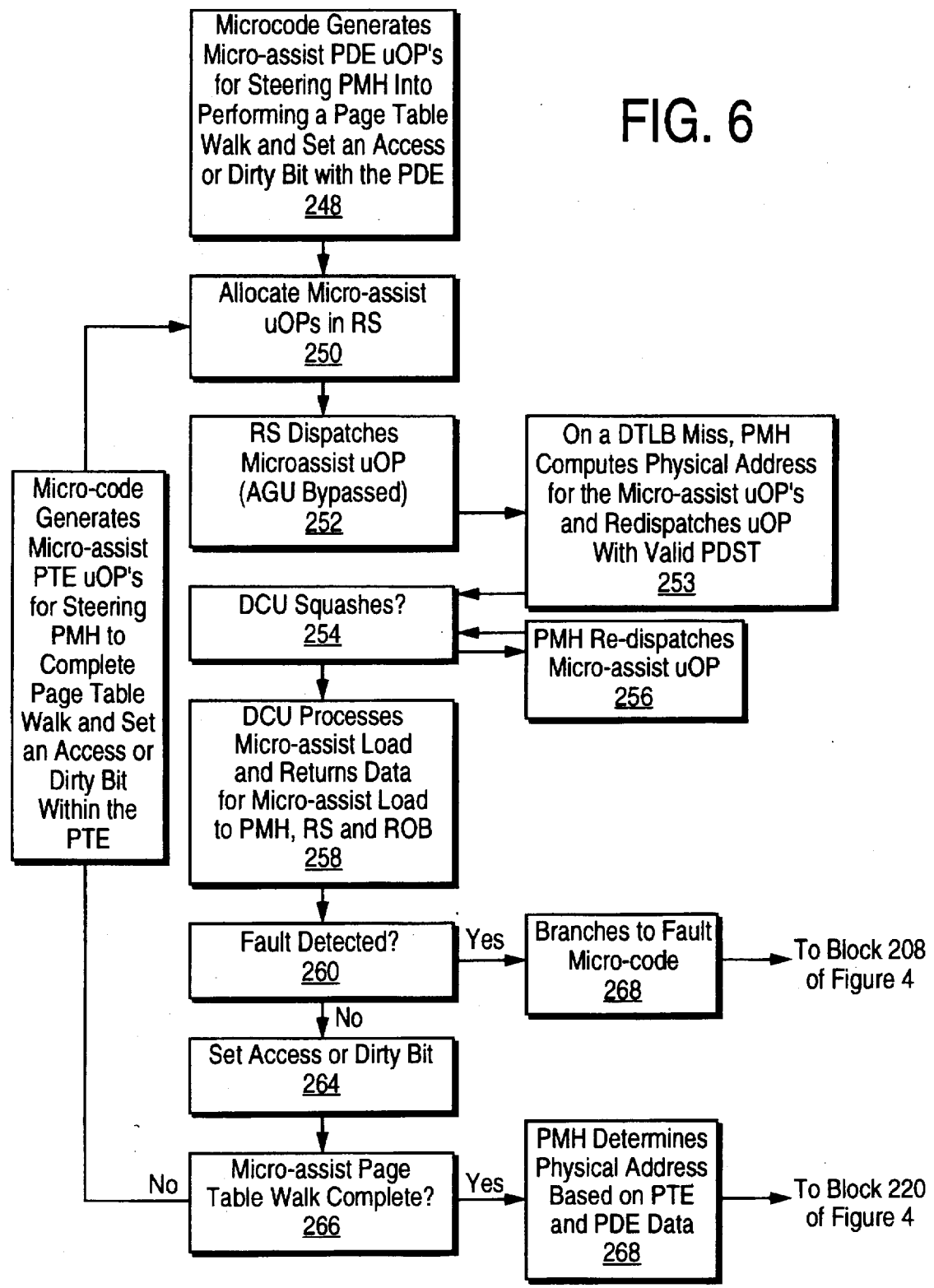
FIG. 6 is a block diagram illustrating a method and apparatus for performing a micro-instruction assisted page table walk.

FIGS. 4–6 illustrate, in flow chart form, the method by which microprocessor 100 in general, and PMH 128, in particular, performs page table walks in a speculative environment. Although FIGS. 4–6 illustrate method steps in a flow chart form, those skilled in the art will appreciate that each block of the flow chart also represents a device or circuit within microprocessor 100 for performing the described action. In some cases, the action will be performed by dedicated hardware. In other cases, the action may be performed by micro-code or other types of software. The details by which the steps of FIGS. 4–6 are actually implemented in hardware or software is not necessarily pertinent to the invention and will not be described in detail, unless noted.

FIG. 4 illustrates an overall flowchart for the processing of memory access operations. Initially, at 200, the instruction fetch and issue unit generates and dispatches a uOP containing a valid OPCODE and PDST value. Although the instruction fetch and issue unit generates a wide variety of uOP's, only memory access uOP's, such as memory loads and memory stores, will be considered herein in detail. Initially, the AT_RETIREMENT bit of the uOP is set to indicate that the uOP is not at retirement. This bit may be set by the instruction fetch and issue unit as the instruction is generated, or the setting of the bit may be performed downstream by, for example, RS 118.

The uOP is intercepted by RS 118 which allocates the uOP, then dispatches the uOP to AGU 116 along CPU bus 115. The RS allocate and RS dispatch operations are identified in FIG. 4 by steps 202 and 204, respectively. As noted above, RS 118 only allocates and dispatches uOP's which have a valid PDST.

After the uOP is dispatched by RS 118, AGU 116 calculates the linear address for the uOP and stores the linear address in linear address space 138 of uOP 134. The calculation of the address is performed in step 206 of FIG. 4.

Memory system 122 receives the uOP along CPU bus 115. However, depending upon the implementation, a separate bus may be utilized between memory system 122 and RS 118 and ROB 120, than between the RS, ROB and other microprocessor components such as the out-of-order execution engine 113.

The uOP received by memory system 122 includes a valid PDST value, and a valid bit indicating whether the uOP is at retirement. For the exemplary uOP under consideration, which has just been generated by the out-of-order execution engine, the uOP is not yet at retirement, and the AT_RETIREMENT bit is therefore set accordingly. However, the memory system also receives other uOP's which may already be at retirement.

Once within the memory system, the uOP is intercepted by DTLB 126 which attempts to perform a translation of the linear address within the uOP to a corresponding physical address. The translation is attempted by accessing cache lines within the DTLB 126 to determine whether the linear address/physical address combination is already contained therein. At 208, the DTLB 126 determines whether the parent uOP results in a DTLB "hit" or a DTLB "miss". If a hit occurred, that is, the linear address/physical address combination was contained within the DTLB 126, then execution proceeds to step 210 where the parent uOP is updated to include the appropriate physical address, and the parent uOP is re-dispatched onto the CPU bus 115. At step 212, the parent uOP is executed to load or retrieve data to or from the physical address. Actual execution of the uOP is performed by DCU 124 which examines internal cache lines to determine whether the data subject to the parent uOP is already contained therein. If the data subject to the parent uOP is not stored within DCU 124, then external memory 110 is directly accessed through system bus driver 130 to retrieve or store the desired data. Actual external memory transactions may be deferred by the MOB, particularly if the parent uOP is speculative.

Once the data for the parent uOP has been properly processed by DCU 124, the parent uOP is re-dispatched with the data contained therein, at step 214, for further processing by other functional units such as RS 118 and ROB 120.

As noted above, the RS and ROB allocate and reorder the parent uOP in conjunction with many of other uOP's and eventually retires the uOP, resulting in actual memory access subject to the uOP to be fully committed to memory. If the parent uOP is already at retirement, no such reordering may be required by the RS/ROB. If the parent uOP is not yet at retirement, then reordering may be required. Details of the operation of the RS and ROB are not pertinent to the present invention, but such details may be found in the above-referenced co-pending U.S. Patent applications.

Thus, for a parent uOP which results in a DTLB hit, no page table walk is required, and execution proceeds directly from step 208 to steps 210, 212, and 214 of FIG. 4. The present invention is primarily directed to circumstances where a DTLB miss occurs, such that a page table walk is required. If a DTLB miss occurs at step 208, execution proceeds to step 216 where PMH 128 receives the parent uOP as well as a DTLB miss signal, then determines whether the parent uOP is currently at retirement. If the parent uOP is already at retirement, i.e. the uOP is non-speculative, then PMH 128 performs a non-speculative page table walk at step 218. The non-speculative page table walk is performed by dispatching PDE and PTE loads from the PMH. PMH 128 calculates the actual physical address, corresponding to the linear address of the parent uOP, from the results retrieved from the non-speculative stuffed PDE and PTE loads. As noted above, stuffed PDE and PTE loads are used, rather than PDE and PTE loads having a valid PDST, such that the pipeline execution of other uOP's is not effected and to avoid any latency which could otherwise result if non-stuffed loads were employed.

After the non-speculative page table walk is completed and the physical address determined, the physical address is stored within the DTLB, at step 220, along with the corresponding linear address, such that another memory access to the same linear address will not necessitate another page table walk, at least until the linear address/physical address combination is overwritten within the DTLB.

At 222, PMH 128 re-dispatches the parent uOP. Now, since the DTLB has been updated to include the linear address/physical address combination, a DTLB hit occurs and execution proceeds at step 210.

If, at step 216, PMH 128 determines that the parent uOP is not at retirement, execution proceeds to step 224 where the PMH then determines whether PDE and PTE memory corresponding to the parent uOP are non-speculateable. If the PDE and PTE memory are known to be non-speculateable, execution proceeds to step 226 where execution of the page table walk is deferred pending retirement of the uOP as determined by the ROB.

Actual deferment of the page table walk, pending retirement of the parent uOP occurs as follows. The PMH transmits a signal to the MOB either along the CPU bus or another bus indicating that the parent uOP should be blocked until retirement. The MOB receives retirement information from the ROB and thereby has information which allows the MOB to determine when all previous uOP's have been retired and when the parent uOP is at retirement. At that time, the MOB dispatches the parent uOP onto the CPU bus.

If the PDE and PTE memory are not non-speculateable, execution proceeds to step 228 where a speculative page table walk is performed. The speculativeability of the memory locations targeted by the stuffed PDE and PTE loads is determined from the MTRR's 129. Other methods for determining the speculatability of the memory targeted by the stuffed loads may also be employed.

Regarding step 224, an actual determination of whether the memory locations targeted by the stuffed PDE and PTE loads are speculateable or not may be made during a page table walk. In other words, such determination need not be made before the page table walk is initiated. Rather a page table walk may be initiated during which appropriate stuffed PDE and PTE loads are generated. Then, if the memory locations targeted by the PDE or PTE loads are found to be non-speculateable, the page table walk is aborted and held pending retirement of the parent uOP, as set forth at step 226. Hence, it should be noted that, although steps 224 and 228 are illustrated as separate steps, the steps may be performed simultaneously or step 224 may represent a sub-step of step 228. In FIG. 4, step 224 is illustrated separately from step 228 to clarify the logic of the overall processing of the parent uOP.

Also, it should be noted that the PMH determines the physical addresses for any stuffed PDE or PTE loads. More specifically, the PMH computes the physical address for the PDE from the linear address of the parent uOP. The PMH computes the physical address for the PTE from the linear address of the parent uOP and from the PDE value. Hence, the PMH is the physical address computation unit for all page table accesses. Once a physical addresses are determined, the PDE or PTE loads are dispatched to the physical address locations to retrieve information therefrom.

Also, in a preferred implementation, the examination of the memory type may be made before the AT_RETIREMENT bit is checked at step 216. In such an implementation, the speculative page table walk is subsequently aborted if the PDE and PTE memory is later found to be non-speculateable and the parent uOP is not at retirement.

At step 224, the PMH also establishes whether a fault condition, such as a page present fault, a reserved bit fault, and the like occurs. If such a fault is present, execution proceeds to step 226, otherwise execution proceeds to step 228. The actual determination of whether a fault occurs may be made another unit, such as the DCU, which sends a signal to the PMH. Thus, the PMH need not make the actual determination of a fault but may merely respond to a fault determination made another unit. Whether faults are detected by the DCU, PMH or some other unit depends upon the particular implementation.

As noted, if, at step 224, the page table memory is known to be non-speculateable or a fault is detected, execution proceeds to step 226 where the parent uOP is held pending retirement, until a non-speculative page walk is performed commencing at step 218. In a preferred embodiment, the function of step 226 is performed by having the PMH re-dispatch the parent uOP with a memory type set to a non-speculateable memory type and with a valid PDST value. As such, the re-dispatched parent uOP is blocked by the MOB, and not re-dispatched until after retirement, as determined by the ROB. The MOB then re-dispatches the parent uOP with the AT_RETIREMENT bit set to indicate that the parent uOP is at retirement. Execution then resumes at step 208. If a DTLB miss again occurs, execution proceeds to step 216, then to step 218 for performing a non-speculative page table walk. Other methods may be implemented for deferring execution of the page table walk for page table memory which is non-speculateable or in circumstances where certain fault conditions may occur.

If at step 224 no fault conditions were detected and the page table memory was not found to be non-speculateable, execution proceeds to step 228, where the PMH performs a speculative page table walk by issuing stuffed PDE and PTE loads. The details of the speculative page walk are set forth in FIG. 5. Once the speculative page table walk of step 228 is completed, execution continues at step 220 where the physical address determined by the page table walk is stored in the DTLB.

Referring to FIG. 5, the speculative page table walk of step 228 will now be described in greater detail. At step 230, the PMH dispatches a stuffed PDE load. The stuffed PDE load of step 230 is dispatched onto CPU bus 115 and intercepted by, and processed by, the other functional elements of the memory system. However, because the stuffed load does not include a valid PDST value, the RS and the ROB do not respond to the stuffed PDE load. MOB 132 and DCU 124 respond to the stuffed load despite the lack of a valid PDST value. In particular, DCU 124 attempts to satisfy the PDE load from its internal caches and, if the data is not present therein, dispatches appropriate loads to external memory to retrieve the data. Preferably, a signal is sent from the PMH to the DTLB causing the DTLB to bypass the stuffed load such that the stuffed load does not cause further DTLB miss signals to be generated, causing still further page table walks.

At step 232, the MOB examines the stuffed PDE load and compares the load with other memory uOP's to determine if an ordering conflict occurs. An ordering conflict may occur if, for example, a senior store operation accesses the same physical address identified by the PDE load. As noted above, a senior store operation is a memory operation which is at retirement but which has not yet been committed to memory via the DCU. At step 232, the PMH also determines if an access or a dirty bit must be set for the page table memory. Access or dirty bits within PDE and PTE tables must be set if corresponding memory pages are modified or accessed as a result of the parent uOP execution. Such will be described in further detail below.

If an ordering conflict occurs or if an access or dirty bit must be set, execution proceeds to step 234 where the MOB transmits a signal to the PMH causing the PMH to squash the stuffed PDE load and to abort the page table walk. After the page table walk is aborted, the PMH re-dispatches the parent load, at step 236, with the memory type of the parent uOP set to a non-speculateable designation. Thereafter, the MOB intercepts the re-dispatched parent uOP and, upon detecting the non-speculateable data type of the parent uOP, blocks further execution of the parent uOP until retirement. After retirement, if an access or dirty bit needs to be set, execution proceeds to step 239 where a micro-assist page table walk is performed. Otherwise, execution returns to step 218 of FIG. 4 where a non-speculative page table walk is performed. The details of the micro-assist page table walk are described below with reference to FIG. 6. The determination, at step 237, of whether a micro-assist page table walk needs to be performed, may be made by examining an appropriate status bit set within the parent uOP at the time the access or dirty bit was encountered.

Continuing with the description of FIG. 5, if at step 232 no ordering conflict is detected and no access or dirty bit must be set, execution proceeds to step 238 where the DCU processes the stuffed PDE load. Under certain circumstances, the DCU may squash the stuffed load. If a stuffed load is squashed, execution proceeds to step 240 where the PMH re-dispatches the squashed stuffed load. A stuffed load is squashed by the DCU if the address of the stuffed load matches the address of another outstanding request in the DCU. The re-dispatch of a squashed stuffed load differs from a re-dispatch of the parent uOP, as set forth in step 236. The re-dispatch of the stuffed load is not deferred until retirement. Rather, the stuffed load is merely re-dispatched as soon as possible to re-attempt the DCU access.

Following step 240, execution returns to step 232 where the re-dispatched stuffed load is again stored and examined by the MOB for possible ordering conflicts. Assuming that no ordering conflicts occur, that no access or dirty bits must be set, and that the DCU does not again squash the stuffed load, execution proceeds to step 242 where the DCU processes the stuffed load and returns data for the stuffed load to the PMH either from an internal cache line or from external memory. As can be appreciated, if an access to external memory is required to satisfy the PDE load, such may require tens or hundreds of clock cycles to occur. If the PMH includes an internal PDE cache, then the PDE stuffed load may be satisfied without requiring action by the DCU.

After data is retrieved for one of the stuffed loads, execution proceeds to step 244 where the PMH determines whether the page table walk is complete. If the page table walk is not yet complete, execution returns to step 230 where the PMH dispatches any remaining stuffed loads, such as the PTE load, that is required. In general, the page table walk is a multi-step operation which may require several stuffed loads, resulting in re-execution of steps 230, 232, 238 and 242. The PMH may include a state machine to help facilitate execution of the various steps of the page table walk. The actual sequence of states that the PMH goes through to perform the page table walk and determine the physical address is not pertinent to the present invention and will not be described in detail herein. As noted, the PMH may also include a PDE cache for caching PDE entries to expedite the page table walk. Also, as noted above, since a determination of whether a speculative page table walk may be performed is based upon the speculatability of the PDE and PTE memory, the page table walk is aborted if the such memory is found to be nonspeculateable during execution of the page table walk. If such occurs, execution proceeds to step 226 (FIG. 4) where the page table walk is deferred until the parent uOP is no longer speculative.

If, at step 244, it is determined that the page table walk is complete, then the PMH determines the physical address corresponding to the linear address of the parent uOP.

When the page table walk is complete, the physical address corresponding to the linear address of the parent uOP is calculated at step 246. As noted above, the PMH accesses the DTLB or the MTRR's to determine the speculatability of the PDE and PTE memory targeted by the stuffed loads. If the PDE and PTE memory is found to be non-speculateable, appropriate action can be taken, including possible re-execution of the page table walk for the parent uOP after retirement of the parent uOP.

With reference to FIG. 6, the micro-assist page table walk of step 239 of FIG. 5 will now be described in detail. Access and dirty bits in the page directory entries and in the page table entries are used by operating system (OS) software for executing page replacement algorithms to determine, for example, which page to swap out of physical memory to a disk when a new page is needed and when no unused pages are available in physical memory. An access bit marks a page which has been accessed by, for example, a load or a store. A dirty bit marks a page which has been subject to a store operation. The access and dirty bits facilitate a determination by the OS of whether page swapping is needed. As noted above, access and dirty bits within the PDE and PTE tables should be set in the event that the corresponding pages are accessed or modified. The access and dirty bits need to be set only if the bits are initially clear when a page table walk is executed. In other words, the access and dirty bits need to be set only on the first load or store to the page. Although such bits could be set speculatively during a speculative page table walk, such action could result in the operating system swapping pages into and out of main memory based on the speculative memory access operation that is later squashed. In such a circumstance, pages could be swapped in and out of memory needlessly. Hence, it is desirable to defer execution of a page table walk requiring the setting of access or dirty bits until the parent uOP has retired. In one possible implementation, the execution of the page table walk requiring the setting of the access or dirty bits is simply performed by re-dispatching the parent uOP after retirement and performing a non-speculative page table walk within the PMH as set forth in step 218 of FIG. 4. Although such an implementation is certainly feasible, a preferred embodiment of the invention performs a page table walk which requires the setting of an access or dirty bit using a micro-code assist. In other words, micro-code uOP's are generated which steer the PMH into performing a page table walk, without the page table walk being actually controlled by the PMH. Preferably the PMH is locked during the entire micro-assisted page table walk to prevent execution of any speculative walks at the same time. The access and dirty bits are set using an atomic access involving locked read/modify/write sequences.

FIG. 6 illustrates a sequence of steps for performing the micro-assist page table walk. At step 248, a micro-code unit (not separately shown) within the out-of-order engine of the microprocessor begins generating a sequence of micro-code uOP's. More specifically, at step 248, a locked PDE load/store pair of uOP's are generated for steering the PMH into initiating a page table walk while setting an access or dirty bit within the PDE. A sequence of steps through which the PDE portion of a page table walk is processed, is illustrated in steps 250-266. After step 266, execution proceeds to 267 where the micro-code generates micro-assist PTE uOP's for steering the PMH to complete the page table walk while setting an access or dirty bit within the PTE. The sequence of steps for performing the actual PTE portion of the page table walk is also illustrated at steps 250-266. Thus, steps 250-266 are executed at least twice to perform the entire page table walk and to separately set, if needed, access and dirty bits within the both the PDE and the PTE.

Steps 250-266 will now be described. The micro-assist uOP's are allocated by the RS at step 250. Since each micro-assist uOP already includes a linear address, the AGU is bypassed. It should be noted that the micro-assist uOP's are non-speculative uOP's since the micro-assist uOP's are generated based on a parent uOP which has already been retired. At step 252 the RS dispatches the micro-assist uOP's to the memory subsystem wherein the PMH, MOB, DTLB, and DCU latch and process the micro-assist uOP's as if the micro-assist uOP's were normal uOP's. Also, the DTLB responds to the micro-assist uOP's by transmitting a miss signal, if appropriate, to the PMH loading the PMH to respond to the micro-assisted page table walk. Preferably the PMH examines the OPCODE of the micro-assist uOP's to determine whether the page table walk should be a micro-assisted page table walk or a non-micro-assisted page table walk, such as described above. The PMH acts as a physical address generation unit for the micro-assisted PDE and PTE loads.

The DCU attempts to satisfy the micro-assist uOP's by retrieving the appropriate page directory or page table data. As with any DCU operation, the DCU may squash the micro-assist uOP's, if other pending DCU operations access the same memory location. If the DCU squashes one of the micro-assist loads, at step 254, execution proceeds to step 256 wherein the PMH re-dispatches the squashed micro-assist uOP. Execution returns to step 254 where the DCU again attempts to satisfy the micro-assist uOP. It should be noted that the DCU returns PDE and PTE load data to the RS and ROB as well as the PMH. This is in contrast to the non-micro-assisted page table walk described above, wherein loads are employed in which the RS and ROB do not receive or respond to. The ROB reorders the micro-assisted loads, as it reorders any non-stuffed load.

If the DCU does not squash the micro-assist uOP, execution proceeds to step 258 where the DCU writes back data for the micro-assist uOP to the PMH and to any other functional components requiring access to the information. Any page fault detected by the DCU is also transmitted to the PMH. In the event that the fault is detected at step 260, execution proceeds to step 262 where the PMH re-dispatches the parent uOP causing the initial DTLB miss, resulting in a non-speculative page table walk as set forth in block 208 of FIG. 4. Within step 262, the micro-code controlling the micro-assisted page table walk may branch into a fault branch for specifically controlling the re-dispatch of the parent uOP. If no fault is detected, the PMH sets the necessary access or dirty bit as appropriate at step 264. The actual setting of the access or dirty bits may also be performed directly by micro-code.

If the page table walk is not yet complete, execution proceeds from step 266 to step 267 where the micro-code generates the aforementioned PTE micro-assist uOP's. Thereafter, steps 250–266 are re-executed for setting the access or dirty bits within the PTE.

If the micro-assist page table walk is complete, then execution proceeds from step 266 to step 268 where the PMH determines the physical address of the parent uOP based on data received from the micro-assist PTE and PDE loads. Thereafter execution proceeds at block 220 of FIG. 4. As with a normal page table walk, the micro-assisted page table walk may require that the PMH transition through several states. However, unlike the page table walks described above, the PMH under a micro-assist page table walk does not control the page table walk but merely responds to the micro-assist uOP's dispatched from the RS.

Thus, FIGS. 1–6 collectively illustrate a method and apparatus for performing page table walks in a microprocessor capable of speculative execution of memory instructions. Numerous implementations of the microprocessor and its internal components may be set forth in accordance with the general principles of the invention. Accordingly, particular details of the structure, function and operation are functional elements such as PMH, DCU, DTLB, RS, MOB and ROB will not be set forth herein. However, as noted above, the invention is preferably implemented within a microprocessor capable of pipelined execution of memory instructions.

Figure 7:
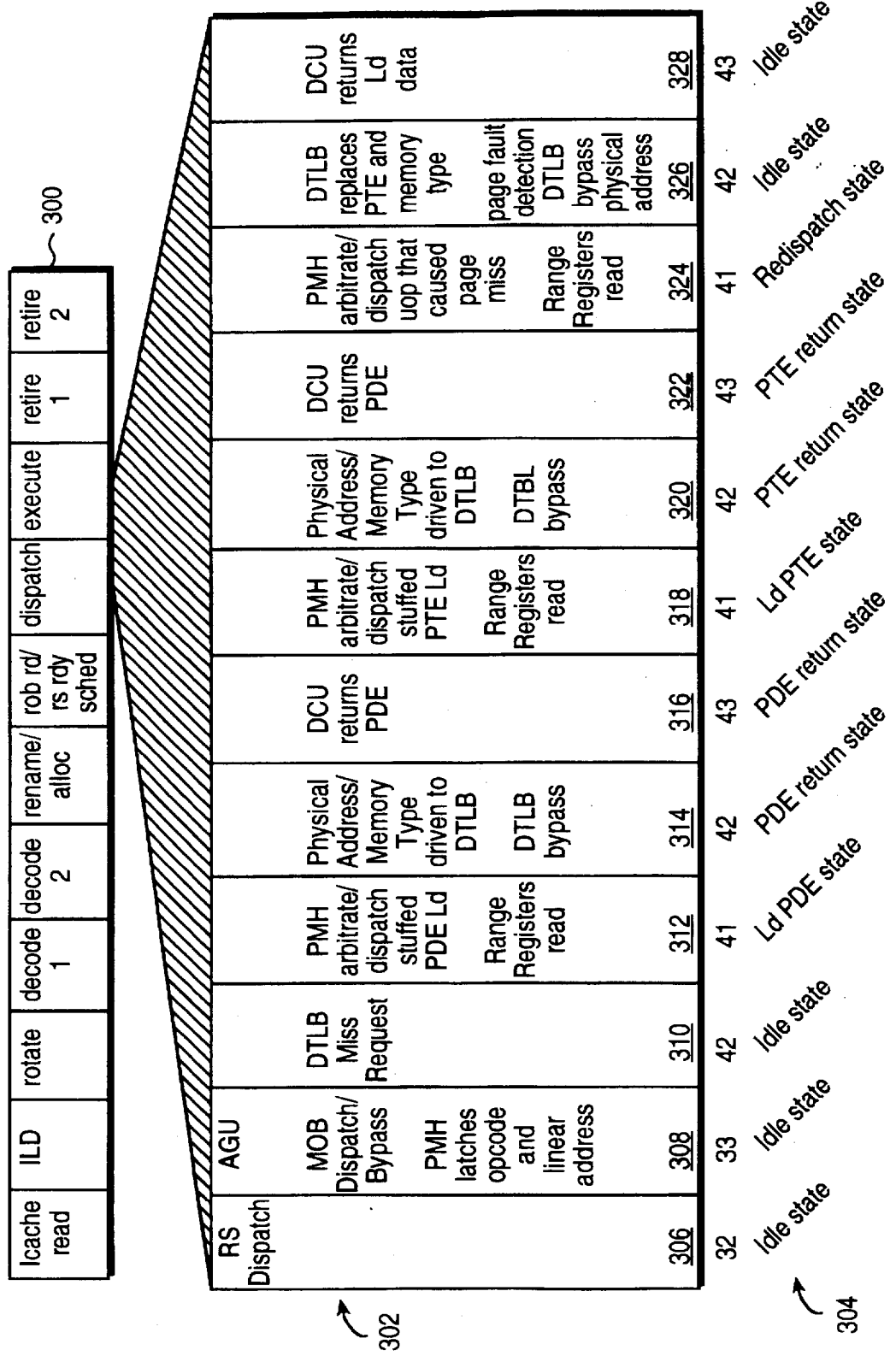
FIG. 7 is a block diagram illustrating a pipe line for performing a page table walk.
Figure 8:
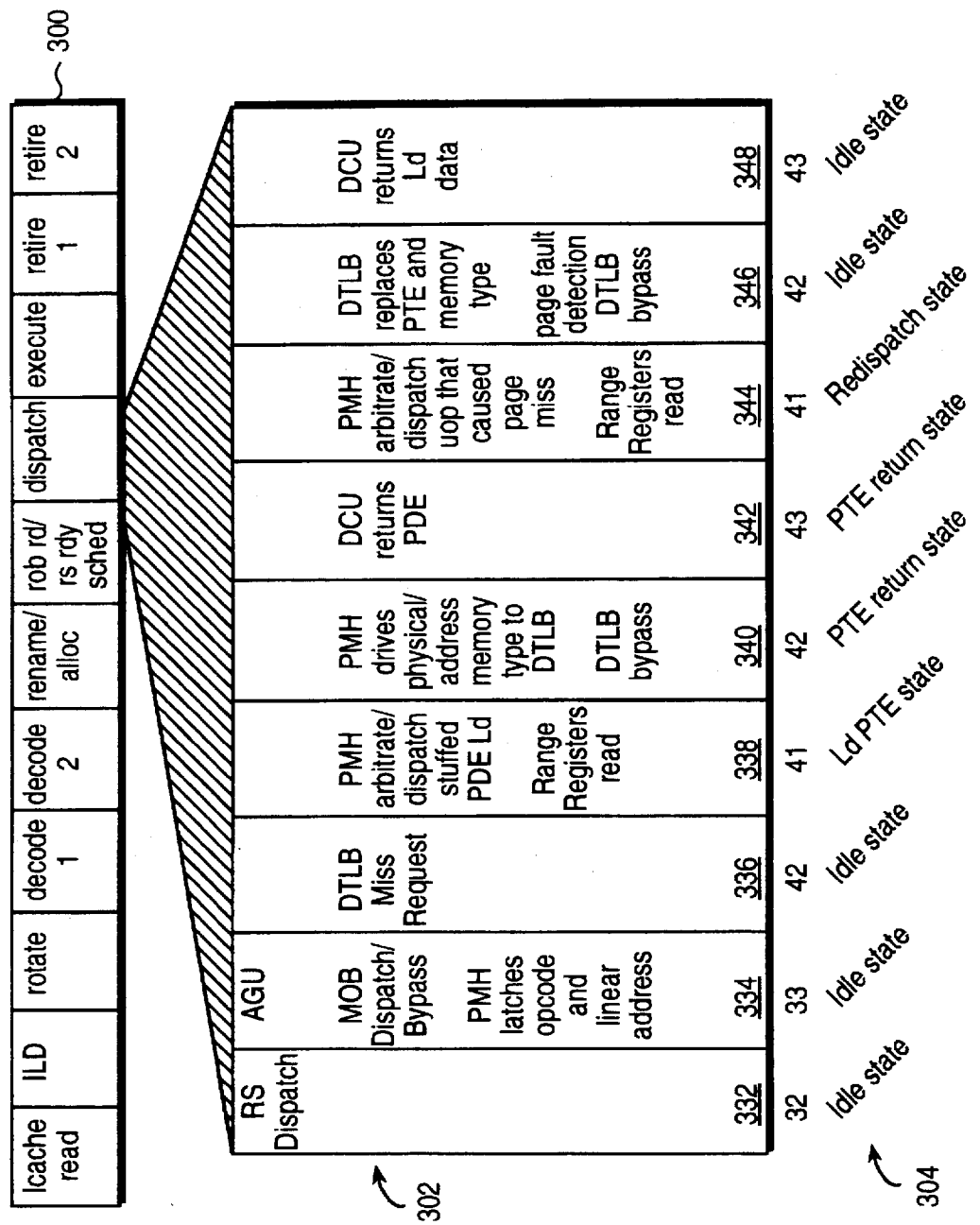
FIG. 8 is a block diagram illustrating a pipe line for performing a page table walk resulting in a PDE cache hit.
Figure 9:
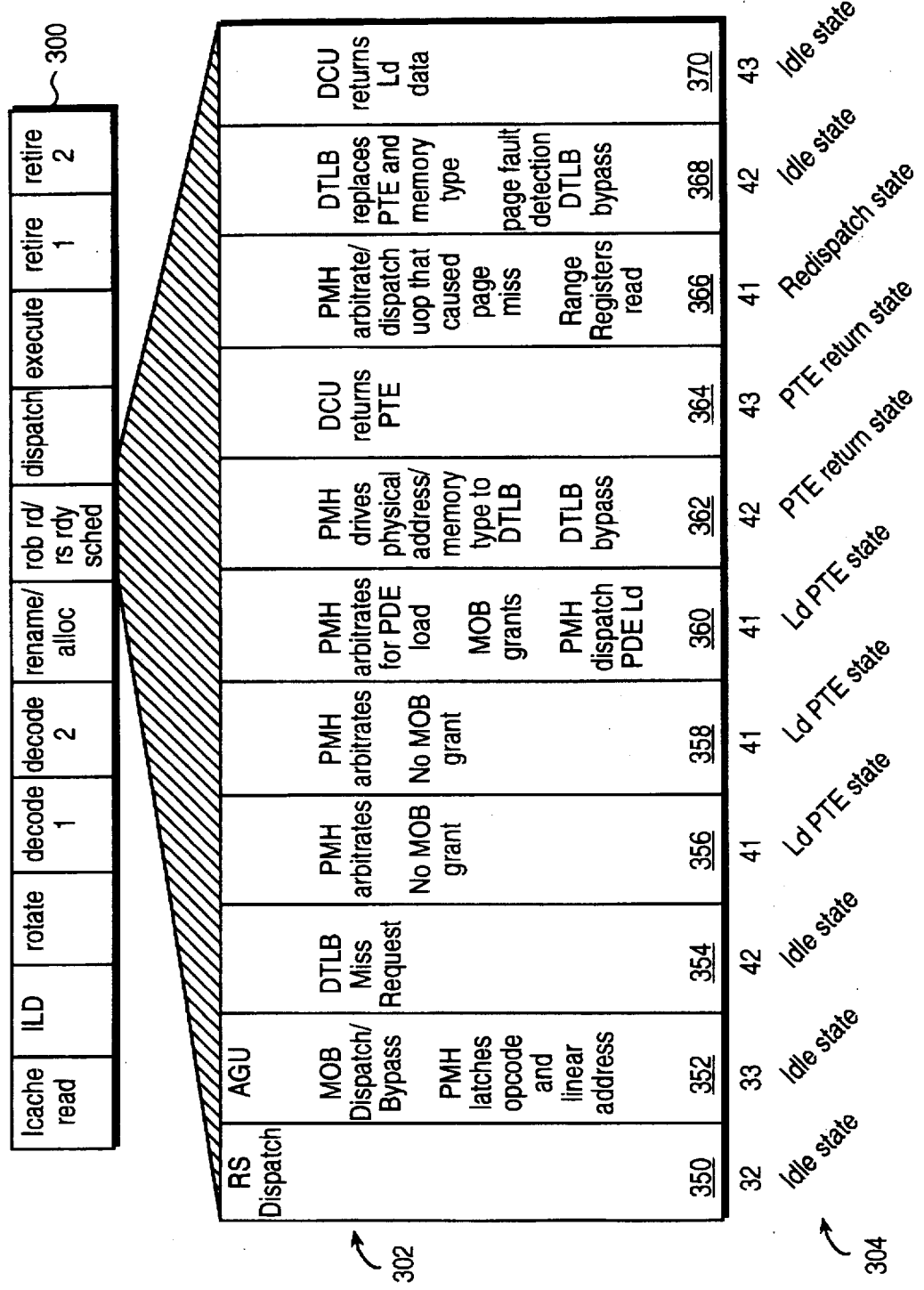
FIG. 9 is a block diagram illustrating a pipe line for performing a page table walk resulting in a PDE cache hit, but where memory pipeline access is deferred.

Referring to FIGS. 7–9, pipeline stages for an exemplary system are set forth. The system having the pipeline of FIGS. 7–9 is configured in accordance with the preferred embodiments described above wherein the PMH includes both MTRR's and a PDE cache for expediting the page table walk. FIG. 7 illustrates a page table walk which misses the PDE cache. FIG. 8 illustrates a page table walk which hits the PDE cache. As will be described more fully below, the actual memory pipeline is only three steps long. Hence, arbitration may be required to coordinate access to the memory pipeline. FIG. 8 illustrates a page table walk for the case of a PDE cache hit, wherein the PMH is delayed in gaining access to the memory pipeline.

Each of FIGS. 7–9 illustrates an overall execution pipeline 300, a page table walk level pipeline 302 as well as the actual states 304 of the PMH. The overall execution pipeline 302 includes stages for an instruction read, an instruction load, a rotate operation and first and second decode operations. Additional pipe stages include a rename/allocate stage, a ROB read/RS ready schedule stage, and dispatch, execute, and first and second retirement stages. Functions performed within overall pipeline 300 are, in general, performed by components of the microprocessor such as the ROB, RS, AGU, etc. and such action will not be described in detail herein.

The page table walk pipeline 302, actually includes stages from the overall pipeline 302, such as a RS dispatch and an AGU stage, as well as separate memory pipeline stages. In FIGS. 7–9 steps of the page table walk are identified by pipeline stages, such as 32, 33, 41, 42 and 43. Pipe stages 41, 42 and 43 represent the three stages of the memory pipeline. Pipe stages 32 and 33 represent stages of the overall execution pipeline 300.

As can be appreciated, at each pipe stage, several memory operations may be performed by different memory components. Indeed, the PMH itself is preferably a two-ported PMH capable of performing at least two operations at each step.

Referring first to FIG. 7, a page table walk which misses the PDE cache will now be described. Initially, at step 306, the RS dispatches a memory load instruction. Next, at step 308, the PMH latches the OPCODE and linear address of the memory load. Steps 306 and 308 correspond to overall execution pipeline stages 32 and 33 respectively.

At step 310 the DTLB dispatches a miss signal indicating that the linear address of the memory load missed the DTLB caches. As a result of the miss the PMH must perform a page table walk and, in the example shown, the page table walk is a speculative page table walk. At step 312 PMH requests access to the three stage memory pipeline to dispatch a stuffed PDE load. Preferably, the MOB performs arbitration on the memory pipeline, although such arbitration could alternatively be performed by other functional units as well. Step 312 corresponds to memory pipe stage 41. During pipe stage 41, the MTRR range registers of the PMH may also be read to determine the memory type corresponding to the PDE load.

Assuming that the MOB grants access to the memory pipeline to the PMH, then on the following 41 pipe stage, i.e. three clock cycles later, the PMH dispatches the PDE load. In FIG. 7, the following 41 pipe stage is also denoted by step 312. At step 314, the PMH dispatches the physical address and memory type of the PDE load to the DTLB. Simultaneously, the DTLB bypasses the stuffed PDE load. Step 314 corresponds to memory pipe stage 42. Next, at step 316, the DCU returns the PDE in response to the PDE load. Step 316 corresponds to memory pipeline stage 43.

At step 318, the PMH again requests access to the memory pipeline to dispatch a stuffed PTE load. Simultaneously, the PMH accesses the MTRR's to determine the memory type for the PTE load. If access is granted, the PMH dispatches the PTE load three clock cycles later. As can be seen, step 318 and step 312 both correspond to memory pipe stage 41 indicating that only one of the two operations can be performed at a given clock cycle. However, the actions of pipe stages 42 and 43 may be performed simultaneously with that of pipe stage 41. In other words, multiple page table walks may be performed substantially concurrently, each being offset by one step.

Again, assuming that access to the memory pipeline is granted and the PTE load dispatched, the PMH drives the physical address and the memory type for the PTE load to the DTLB at step 320. Simultaneously, the DTLB bypasses the stuffed PTE load. At step 322, the DCU returns the PDE. With the PDE and PTE values now received by the PMH, the physical address can be calculated.

At step 324, the PMH again accesses the range registers, this time to determine the memory type for the physical address of the memory load. Also, the PMH requests access to the memory pipeline to re-dispatch the memory load that caused the initial page miss. If access is granted, the PMH dispatches the parent uOP three clock cycles later during the next occurrence of step 324. At step 326, the DTLB updates its internal cache lines. Page fault detection may also occur at step 326. Also, at step 326, the DTLB bypasses the physical address of the parent uOP. Ultimately, at step 328, the DCU responds to the original memory load to return load data.

In the forgoing, the PMH is active only during stages 312-324 and is idle during stages 306-310 and 324-326.

It should be noted that FIG. 7 illustrates pipe stages, and not a sequence of sequential clock cycles. The actual number of clock cycles required to perform a page table walk may vary greatly depending upon, for example, whether the DCU can satisfy the stuffed PDE and PTE loads promptly or must access main memory to satisfy the loads.

FIG. 8 illustrates a page table walk which hits the PDE cache. As can be seen from a comparison with FIG. 8 with FIG. 7, the page table walk of FIG. 7 is considerably simpler. Only a total of nine steps, denoted 330-348 are required. Many of these steps correspond with those of FIG. 7 and will not be described again. Notably, however, because the PMH is able to satisfy the stuffed PDE load from within its own PDE cache, a PDE load need not be dispatched to the DCU. Rather, the PMH proceeds to dispatch a PTE load at step 338, immediately after the DTLB miss request of step 336.

In both FIGS. 7 and 8, access to the memory pipeline for the PMH is granted by the MOB. Thus, the PMH dispatches the stuffed PDE and PTE loads three clock cycles later. In FIG. 9, page table walk steps are illustrated wherein there is a delay in arbitration grant by the MOB to the PMH. As with FIG. 8, the page table walk of FIG. 9 illustrates the simplified case of a PDE cache hit wherein a stuffed PDE load need not be dispatched to the DCU. Nevertheless, a total of eleven steps are required, denoted 350-370, to complete the page table walk. Many of these steps are identical to those of FIG. 7 and will not be described in detail again. Notably, however, when the PMH requests access to the memory pipeline at step 350, no grant is immediately given by the MOB. Accordingly, the PMH cannot dispatch the load three clock cycles later and must re-request access to the pipeline at step 358. Again, as can be seen, no arbitration grant is given by the MOB. Finally, at step 360, the MOB grants access to the memory pipeline, to the PMH, such that the PMH can dispatch a PDE load during the next 41 pipe stage, i.e., three clock cycles latter.

Thus, FIGS. 7-9 illustrate exemplary pipe stages for execution of a speculative page table walk by the PMH. It should be noted that, the pipe stages of FIGS. 7-9 do not illustrate the micro-assisted page table walk of FIG. 6, which is controlled by micro-code.

What has been described is a method and apparatus for responding to DTLB misses within a microprocessor capable of a speculative execution memory instructions. The microprocessor itself can be configured using a wide variety of fabrication techniques, including, for example, silicon or gallium arsenide techniques. Each component described above may be configured within a single integrated chip or on several chips. The microprocessor itself may be only one microprocessor within a multiprocessor environment. The method and apparatus are preferably configured in accordance with Intel Processor Architecture. However, principles of the invention may be applied to other microprocessor architectures as well and is not limited to an Intel architecture. In general, the exemplary embodiments described herein are merely illustrative of the invention and the scope of the invention is not limited to those illustrative embodiments.

What is claimed is:

1. A method for performing a speculative page table walk when a memory instruction causes a translation lookaside buffer (TLB) miss in a microprocessor capable of performing operations speculatively, said method comprising the steps of:

determining that the memory instruction is a speculative instruction;

dispatching page directory entry (PDE) and page table entry (PTE) loads which do not have a valid destination value;

fetching data associated with said PDE and PTE loads in the event that said PDE and PTE loads access speculateable memory;

loading a physical address that corresponds to a linear address of the memory instruction into said TLB in response to said fetching step.

2. The method of claim 1 further comprising the step of:
   aborting said speculative page table walk in the event that said PDE and PTE loads access non-speculateable memory locations.

3. The method of claim 2 further comprising the step of:
   aborting said speculative page table walk in the event that a memory ordering violation occurs.

4. The method of claim 2 wherein said aborting step comprises the step of:
   re-dispatching said memory instruction with a non-speculateable designation; and
   deferring execution of said re-dispatched memory instruction until retirement of said memory instruction.

5. The method of claim 1 further comprising the step of:
   in response to a page fault, deferring said speculative page table walk until said page fault has been resolved.

6. The method of claim 1 further comprising the steps of:
   aborting said speculative page table walk;
   re-dispatching said memory instruction with a non-speculateable designation;
   dispatching instructions which control performance of a non-speculative page table walk and setting of an access bid or a dirty bit.

7. In a microprocessor which speculatively executes instructions having an identification value, said microprocessor including a reservation station (RS) for allocating and dispatching said instructions, a re-order buffer (ROB) for re-ordering and retiring said instructions, a memory ordering buffer (MOB) for ordering the execution of memory instructions, a data cache unit (DCU) for caching data subject to said memory instructions, a translation lookaside buffer (TLB) for caching physical addresses and corresponding linear addresses for selected data locations, and a page miss handler (PMH) which performs page table walks to determine said physical addresses corresponding to said linear addresses of a memory instruction, a method of operation comprising the steps of:

dispatching a speculative memory instruction from said RS, said speculative memory instruction including a linear address defining a physical address location, said linear address missing said TLB;

performing a speculative page table walk to determine said physical address corresponding to said linear address, said speculative page table walk including the steps of:

dispatching page directory entry (PDE) and page table entry (PTE) loads which do not have said identification value, said PDE and PTE loads accessing speculateable memory;

fetching data associated with said PDE and PTE loads;

loading said physical address into said TLB in response to said fetching step.

8. The method of claim 7 further comprising the steps of:

transmitting a signal from said MOB to said PMH which causes said PMH to abort said page table walk if a store to said physical address location is older than said speculative memory instruction;

re-dispatching said speculative memory instruction; and executing said re-dispatched speculative memory instruction following retirement of said speculative memory instruction.

9. The method of claim 7, further comprising the steps of:

aborting said speculative page table walk;

waiting until said speculative memory instruction retires; and executing micro-code instructions which cause said PMH to perform a non-speculative page table walk; and setting an access bit or a dirty bit.

10. An apparatus for determining the physical address of a memory instruction causing a data translation lookaside buffer (TLB) miss within a microprocessor capable of generating speculative memory instructions, said apparatus comprising:

means for determining whether said memory instruction is a speculative memory instruction;

means for performing a speculative page table walk by dispatching page directory entry (PDE) and page table entry (PTE) loads from said PMH, said PDE and PTE loads lacking a valid identification value;

reservation station means for allocating and dispatching instructions having said valid identification value;

re-ordering buffer means for reordering and retiring speculative instructions having said valid identification value, said re-ordering buffer means and said reservation station means being non-responsive to said PDE and PTE loads.

11. The apparatus of claim 10, further including:

memory ordering buffer (MOB) means for storing and re-ordering memory instructions, said MOB means responding to instructions irrespective of said valid identification value; and wherein said means for performing said speculative page table walk further includes:

means for ordering said PDE and PTE loads within said MOB and for detecting memory ordering violations; and means for aborting said page table walk in response to a memory ordering violation.

12. The apparatus of claim 11, wherein said means for aborting said page table walk includes means for re-dispatching said memory instruction from said PMH with a non-speculateable designation.

13. The apparatus of claim 10, further comprising:

a data cache unit (DCU) means for retrieving data subject to a memory instruction.

14. The apparatus of claim 13, further including means for detecting a page fault condition.

15. The apparatus of claim 11, further including:

means for dispatching micro-code instructions which cause an access bit or a dirty bit to be set for a corresponding page of memory.

16. The apparatus of claim 10, further including:

means for updating said TLB with said physical address determined during said page table walk.

17. A microprocessor comprising:

an out-of-order engine which generates memory instructions having linear addresses;

reservation station that allocates and dispatches instructions having a valid identification value;

re-ordering buffer that reorders and retires speculative instructions having a valid identification value;

a translation lookaside buffer (TLB) which caches linear addresses and corresponding physical addresses; and a page-miss handler (PMH) that performs a page table walk to determine a physical address corresponding to a linear address, said PMH determining whether a memory instruction causing a TLB miss is a speculative memory instruction, and performing a non-speculative page table walk, if the memory instruction is non-speculative, and performing a speculative page table walk, if said memory instruction is speculative.

18. The apparatus of claim 17, wherein said PMH comprises:

means for dispatching page directory entry (PDE) and page table entry (PTE) loads, said PDE and PTE loads lacking said valid identification value;

wherein said ROB and said RS are non-responsive to said PDE and PTE loads during said speculative page table walk.

19. The apparatus of claim 17, further including:

means for storing and re-ordering memory instructions, said buffer means ordering said PDE and PTE loads relative to other loads and detecting a memory ordering violation; and;

means for aborting said page table walk responsive to said memory ordering violation.

20. The apparatus of claim 19, wherein said dispatching means re-dispatches said memory instruction with a non-speculateable designation, execution of said re-dispatched memory instruction being deferred by said buffer means until retirement.

21. The apparatus of claim 19, further including:

a data cache unit (DCU) that stores data associated with said memory instruction.

22. The apparatus of claim 21 wherein said DCU includes means for detecting page fault conditions; and said dispatching means re-dispatches said memory instruction with a non-speculateable designation upon detection of a page fault.

23. The apparatus of claim 17 wherein:

said out-of-order engine includes means for dispatching micro-code PDE and PTE instructions which cause said PMH to perform said non-speculative page table walk and set an access bit or a dirty bit for selected pages of memory.

24. A microprocessor capable of out-of-order and speculative execution of instructions, comprising:

out-of-order engine for generating instructions;

a reservation station (RS) for storing instructions that have yet to be executed;

a memory ordering buffer (MOB) for ordering the execution of memory instructions;

a data cache unit (DCU) for caching data subject to the memory instructions;

a translation lookaside buffer (TLB) for caching physical address and corresponding linear addresses for selected data locations;

a page miss handler (PMH) for performing page walks for memory instructions to determine a physical address corresponding to a linear address, with said PMH capable of performing said page table walk speculatively; and a re-ordering buffer (ROB) for re-ordering and retiring instructions.

25. The apparatus of claim 24, wherein:

said PMH determines whether an event has occurred preventing speculative determination of the physical address, aborts the page table walk upon the detection of said event, and sends a request through the TLB to the RS and MOB indicating said event.

26. The apparatus of claim 24, further including a memory bus connecting said RS, MOB, DCU, TLB and PMH; and wherein said memory instruction is a load defined by a microinstruction (uOP), and wherein said MOB maintains a value uniquely identifying each pending uOP; and said PMH dispatches a stuffed load onto said memory bus, said stuffed load being a uOP having no associated value.

27. A computer system comprising:

a plurality of microprocessors capable of speculative execution of instructions;

an input/output unit;

a memory;

a system bus for interconnecting said microprocessors, said input/output unit and said memory; wherein each of said microprocessors includes an out-of-order engine for generating memory instructions having linear addresses;

a reservation station for allocating and dispatching instructions having a valid identification value;

a re-ordering buffer for reordering and retiring speculative instructions having a valid identification value;

a translation lookaside buffer (TLB) for caching linear addresses and corresponding physical addresses; and a page-miss handler (PMH) for performing a page table walk to determine a physical address corresponding to a linear address not found in the TLB, said PMH determining whether the memory instruction causing the TLB miss is a speculative memory instruction and performing a non-speculative page table walk, if the memory instruction is non-speculative; and performing a speculative page table walk, if said memory instruction is speculative.

* * * * *

UNITED STATES PATENT AND TRADEMARK OFFICE
CERTIFICATE OF CORRECTION

PATENT NO.    : 5,680,565
DATED         : October 21, 1997
INVENTOR(S)   : Glew et al.

It is certified that error appears in the above-identified patent and that said Letters Patent is hereby corrected as shown below:

In column 13 at line 31 delete "nonospeculateable"
and insert --non-speculateable--

Signed and Sealed this

Sixth Day of January, 1998

Attest:

BRUCE LEHMAN

Attesting Officer

Commissioner of Patents and Trademarks